(12) United States Patent  
Van Garderen et al.

(10) Patent No.: US 7,930,698 B2  
(45) Date of Patent: *Apr. 19, 2011

(54) DISTRIBUTED DOCUMENT HANDLING SYSTEM FOR CARRYING OUT A JOB BY APPLICATION SERVICES DISTRIBUTED OVER A NETWORK

(75) Inventors: Harold Ferdinand Van Garderen, Nijmegen (NL); Martinus Jansen, Nijmegen (NL); Eelco Klaver, Weesp (NL)

(73) Assignee: Oce-Technologies B.V., Venlo (NL)

( * ) Notice: Subject to any disclaimer, the term of this patent is extended or adjusted under 35 U.S.C. 154(b) by 5 days.

This patent is subject to a terminal disclaimer.

(21) Appl. No.: 12/426,351

(22) Filed: Apr. 20, 2009

(65) Prior Publication Data

US 2009/0204970 A1    Aug. 13, 2009

Related U.S. Application Data

(63) Continuation of application No. 09/974,911, filed on Oct. 12, 2001, now Pat. No. 7,539,990.

(30) Foreign Application Priority Data

Oct. 13, 2000   (EP) .................................. 00203538

(51) Int. Cl.  
*G06F 9/46* (2006.01)  
*G06F 15/16* (2006.01)  
*G06F 7/04* (2006.01)

(52) U.S. Cl. ............. 718/100; 718/102; 709/203; 726/2

(58) Field of Classification Search .................. 718/100, 718/102; 709/203  
See application file for complete search history.

(56) References Cited

U.S. PATENT DOCUMENTS

| 5,077,795 | A | * | 12/1991 | Rourke et al. .................. 380/55 |
| 5,802,502 | A | | 9/1998 | Gell et al. |
| 6,064,838 | A | | 5/2000 | Maruta et al. |
| 6,359,711 | B1 | * | 3/2002 | Cole et al. ....................... 398/58 |
| 6,623,527 | B1 | | 9/2003 | Hamzy |
| 6,678,415 | B1 | | 1/2004 | Popat et al. |
| 6,700,674 | B1 | | 3/2004 | Otsuka et al. |
| 6,868,189 | B1 | | 3/2005 | Hoshino |
| 6,917,979 | B1 | * | 7/2005 | Dutra et al. ................... 709/229 |
| 7,042,585 | B1 | | 5/2006 | Whitmarsh et al. |
| 7,730,172 | B1 | * | 6/2010 | Lewis ........................... 709/224 |
| 2002/0107817 | A1 | | 8/2002 | Nakajima |
| 2009/0094541 | A1 | * | 4/2009 | Foulger et al. ................ 715/764 |

FOREIGN PATENT DOCUMENTS

| EP | 0 797 344 A2 | 9/1997 |
| WO | WO-95/31063 A1 | 11/1995 |

* cited by examiner

*Primary Examiner* — Kenneth Tang  
(74) *Attorney, Agent, or Firm* — Birch, Stewart, Kolasch & Birch, LLP

(57) ABSTRACT

Disclosed is a networked reproduction system comprising connected scanners, printers and servers. A reproduction job to be carried out includes a number of subtasks. For the execution of these subtasks, services distributed over the network are available. A service management system selects appropriate services and links them to form paths that are able to fulfill the reproduction job. The user may define additional constraints that apply to the job. A path, optimal with respect to constraints, is selected.

2 Claims, 9 Drawing Sheets

| TYPE OF APPLICATION SERVICE | GUID | ATTRIBUTES |
|---|---|---|
| PRINTER | AS 1 | DOCUMENT-FORMAT-SUPPORTED = POSTSCRIPT<br>MEDIA-SUPPORTED = IOS-A4-WHITE, NA-LEGAL-WHITE<br>FINISHING-SUPPORTED = SORTED, COLLATED, PUNCH, STAPLE<br>COSTS = PAY: PAGE: 0,10: $<br>LOCATION = NL 5900 PL 3G |
| CONVERSION_OF_DOC UMENTFORMAT | AS 2 | CONVERSION-SUPPORTED = PDF-POSTSCRIPT<br>COSTS = PAY: FILE: 1: $<br>LOCATION = NL 5900 PL 3 B |
| CONVERSION_OF_DOC UMENTFORMAT | AS 3 | CONVERSION-SUPPORTED = PCL-POSTSCRIPT<br>COSTS = PAY: FILE: 3: $<br>LOCATION = NL 5900 PL 3 B 25 |
| CONVERSION_OF_DOC UMENTFORMAT | AS 4 | CONVERSION-SUPPORTED = PCL-PDF<br>COSTS = PAY: FILE: 1: $<br>LOCATION = NL 5900 PL 24 |
| CONVERSION_OF_DOC UMENTFORMAT | AS 5 | CONVERSION-SUPPORTED = EMF-PCL, EMF-HTML<br>COSTS = PAY: FILE: 1: $<br>LOCATION = NL 5900 PL 3 B 25 |
| PRINTER | AS 6 | DOCUMENT-FORMAT-SUPPORTED = HPGL<br>MEDIA-SUPPORTED = ISO-A4-WHITE, NA-LEGAL-WHITE<br>COSTS = PAY: PAGE: 0,10: $<br>LOCATION = NL 5900 PL 16 3A 35 |

FIG.5

```
┌─────────────────────────────────────────────────────────────┐
│                                              ┌─601          │
│  ┌──────────────────────────┐  ┌──────────────────────────┐ │
│  │ NUMBER OF COPIES   100 ◇ │─602│ PRICE RATE:   <    15$ ◇ │─609
│  ├──────────────────────────┤  ├──────────────────────────┤ │
│  │ COLOR:   Y/N        N  ◇ │─603│ SECURITY LEVEL: NOT DEFINED ◇│─610
│  ├──────────────────────────┤  ├──────────────────────────┤ │
│  │ STAPLE:  Y/N        Y  ◇ │─604│ RELIABILITY LEVEL: NOT DEFINED ◇│─611
│  ├──────────────────────────┤  ├──────────────────────────┤ │
│  │ OUTPUT SHEET:            │─605│ PLACE OF DELIVERY: NOT DEFINED ◇│─612
│  │   FORMAT          A4   ◇ │  ├──────────────────────────┤ │
│  │   MEDIUM TYPE   PAPER  ◇ │    │ PRINT BEFORE:   NOT DEFINED ◇│─613
│  │   COLOR         BLANK  ◇ │                                │
│  ├──────────────────────────┤                                │
│  │ SORTED/COLLATED:  SORTED◇│─606                            │
│  ├──────────────────────────┤        ┌──────────────┐        │
│  │ DENSITY:           50% ◇ │─607  615─│ SETTINGS OK ?│       │
│  ├──────────────────────────┤        └──────────────┘        │
│  │ ZOOM FACTOR:      AUTO ◇ │─608  616─┌──────────────┐       │
│  ├──────────────────────────┤          │   CANCEL     │       │
│  │ FILE:       C:\REPORT.DOC│─613      └──────────────┘       │
│  └──────────────────────────┘                                │
│  MESSAGES:                                   ┌─614           │
│  ┌──────────────────────────────────────────────────────┐   │
│  │ PLEASE MAKE YOUR SETTINGS                            │   │
│  │                                                      │   │
│  │                                                      │   │
│  └──────────────────────────────────────────────────────┘   │
└─────────────────────────────────────────────────────────────┘
                            FIG.6a
```

```
                                              ┌─614
┌──────────────────────────────────────────────────────────┐
│ JOB MAY BE CARRIED OUT WITH INDICATED CONSTRAINTS. PLEASE SELECT ONE FROM THE LIST: │
│ 618─┌PRICE┐  ┌SECURITY┐  ┌RELIABILITY┐─618                │
│ □─617  10 $      —            —                           │
│ □      15 &      — 618        —                           │
│  └617                                                     │
│        ┌─────────────┐ ┌──────────────┐ ┌────────┐        │
│        │ SELECTION OK│ │MODIFY SETTINGS│ │ CANCEL │        │
│        └─────────────┘ └──────────────┘ └────────┘        │
└──────────────────────────────────────────────────────────┘
                            FIG.6b
```

DISTRIBUTED DOCUMENT HANDLING SYSTEM FOR CARRYING OUT A JOB BY APPLICATION SERVICES DISTRIBUTED OVER A NETWORK

The present application is a 37 C.F.R. §1.53(b) continuation of U.S. patent application Ser. No. 09/974,911 filed Oct. 12, 2001, now U.S. Pat. No. 7,539,990, which claims priority from European Patent Application No. 00203538.4, filed Oct. 13, 2000, the entire contents of which are hereby incorporated by reference.

FIELD OF THE INVENTION

The invention relates to a distributed document handling system for carrying out jobs, where jobs are carried out by a path of services distributed over a network and where a job leads to a product, the term path of services being used to denote the set of services that are involved in realizing the requested job according to product specifications, wherein the services included in the path are not necessarily a set of services that are executed in sequence but may also encompass services that have to be executed in parallel.

BACKGROUND OF THE INVENTION

With the advent of digital technology, the digital copier became feasible. Basically a digital copier comprises a scanner for converting hard copy images into electronic images and a printer for converting electronic images into hard copy images. Between scanner and printer the image is available as an electronic digital image. It is this characteristic that provides the ability to provide a digital copier with a wealth of features that were not feasible before. Due to the digital technology the copier was enhanced by all kinds of features that then became possible, such as queueing of jobs, electronic rdf, image enhancements by performing digital signal processing on the electronic images, editing of images, pattern recognition processing etc.

Furthermore these apparatus were able to communicate the electronic images, so that such a copier could be used as a printer to print images received from a host computer and could be used as a fax apparatus to exchange images with other fax machines.

Recently, it became also known to use the communication facility to exchange print job images from one reproduction apparatus with another reproduction apparatus with the purpose to process the images on the other apparatus, where after the processed images are sent back to the originating reproduction apparatus and printed out.

Such a facility is described in EPA 0797344 which is assigned to the SHARP Corporation. The EPA '344 reference describes a distributed document handling system comprising a plurality of image forming apparatuses that are operatively connected so as to communicate with each other. Each image forming apparatus comprises a number of services that perform image processing functions. The apparatuses can exchange image information with each other through the communication apparatus. As shown in the system described above, in a dynamic distributed environment, tasks can be performed by linking services that carry out subtasks.

However, the more services are available in such an environment, the more combinations of services are possible. As the number of available services increases, one may expect the number of combinations that perform a desired task to rise as well. In such case, a system according to the background art will become unmanageable. Furthermore not all such combinations will be desirable in the light of restrictions that are imposed by the environment or by the requester. The background art does not address these problems.

SUMMARY OF THE INVENTION

The invention, in part, obviates the above-described disadvantages and provides a distributed information processing system that efficiently and effectively supports the linking of services and yields combinations of services that fulfill the needs of a user to a greater extent. Such a system comprises: a pool of services, the services being distributed over a number of interconnected processing devices; means for entering a job specification comprising product specifications specifying the product to be delivered by the job; and means for determining a path of services, the services being selected from the pool of services, suitable to carry out the job in accordance with the product specifications.

The invention realizes an improvement, in part, by providing a job specification that, in addition to what is typically specified in the background art, also specifies circumstantial constraints without effect on the product such that means for determining the path of services can take into account circumstantial constraints for that job. This takes away the disadvantage that a high number of combinations otherwise becomes unmanageable.

In selecting a path, the system according to the invention is also able to take into account restrictions regarding e.g. price, reliability and secrecy. The measure according to the invention allows the user to apply more constraints, including constraints not reflected in the final product to be delivered by the job, so that the number of solutions provided by the system is more in compliance with the needs of the user.

The invention also provides, in part, a circumstantial constraint to define a limit in an ordered range; and the system according to the invention can also comprise means for ranking paths suitable to carry out the job in accordance with the ordered range of the circumstantial constraint and user interface means for selection by the user of a desired job specification from a ranked list of job specifications based on the ranked paths. A circumstantial constraint may be such that it is expressed as a value range in a certain domain, e.g. the price has to be lower than a certain amount expressed in a certain currency. This allows the generation of a number of paths that all fulfill the constraints, albeit with variations in the values found for a certain circumstantial constraint. In this way, optimization is possible for a certain constraint.

The system according to the invention can further comprise user interface means for selection by the user of the circumstantial constraint to be used in the ranking of the paths. Most of the time, multiple paths suited to carry out the job will be delivered by the system. These paths will differ in the extent to which the conditional constraints are fulfilled. This feature according to the invention provides the user with a facility to easily grasp the path that best suits his needs.

The invention, also in part, provides that the circumstantial constraint can be a total price of the job to be carried out and the system according to the invention can also comprise means for calculating the total price from price attributes of services included in a determined path. In this way a user can easily find the cheapest way for the carrying out of the job.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

FIG. 5 depicts records of application services according to the invention.

FIGS. 6a-6b depict operating screens of the job submission handler according to the invention.

DESCRIPTION OF THE EMBODIMENTS

Figure 1:
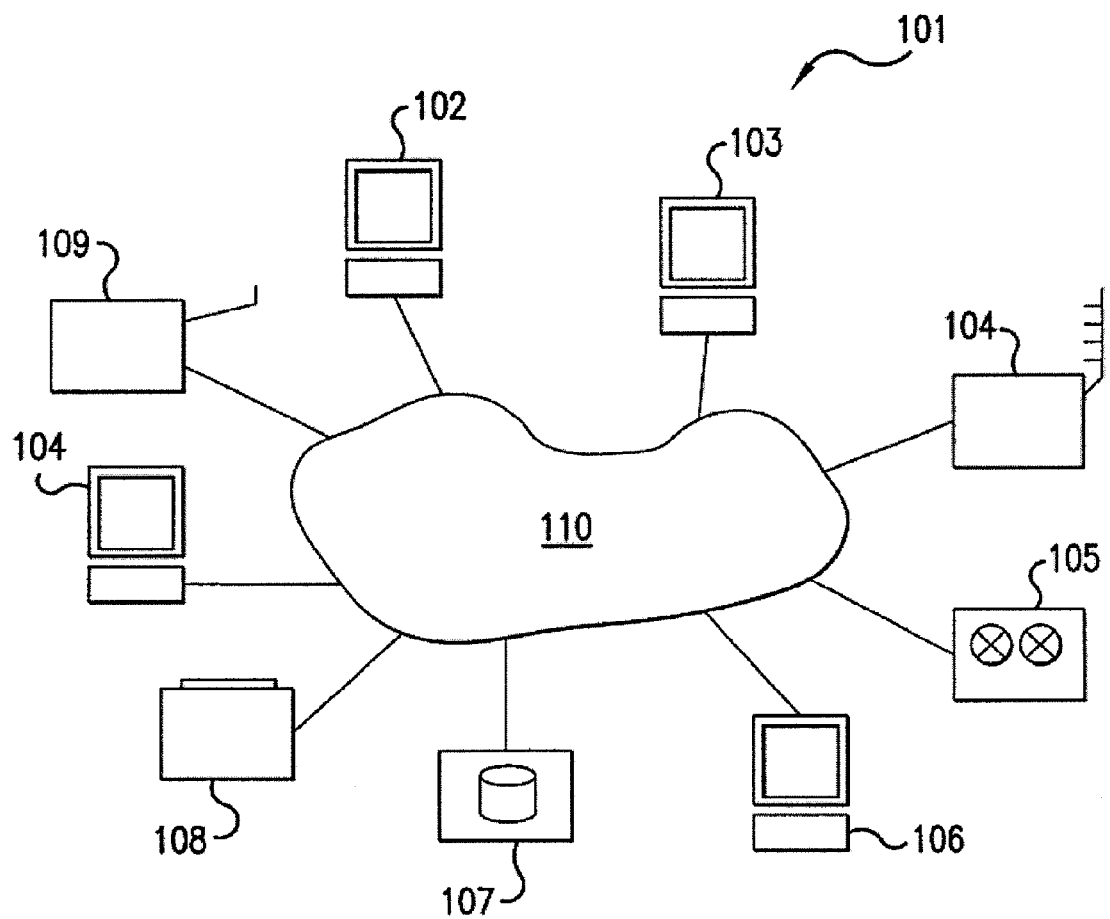
FIG. 1 depicts a distributed system according to the invention.

FIG. 1 diagrammatically illustrates an embodiment of a distributed document handling system according to the invention. The image forming system 101 comprises a number of processing devices or peripherals 102-109 interconnected via a network 110 and thus able to communicate with each other. In particular, by way of example, peripheral 109 is a low volume copier/printer, peripheral 108 is a scanner, peripheral 104 is a high volume printer, peripheral 107 is a file server, peripheral 105 is a general server, peripherals 102, 103, 104 and 106 are workstations. The network 110 is a local area network. Network 110 can also be, or include, the Internet.

The distributed document handling system according to the invention carries out jobs on documents. Documents may be described or characterised in a variety of ways. For the description of the invention, a document will be characterised in terms of actual properties a document has at a certain moment. Such properties determine a state the document is in at that moment. Such a state corresponds with a particular manifestation of the document at a certain moment. In a first state, the document may be manifested as a particular file encoded in ASCII, in a next state the document may be manifested as a hard copy, printed on A4-sheets, double sided and stapled. A job will be expressed now as a transformation of a document with an initial state $s_i$ to the document with a target state $s_t$.

According to the invention, a job is carried out by services distributed over the network. These services are available at various peripherals in the network and perform specific functions on documents. Examples of such functions are image processing, printing, scanning, encrypting and conversion from one page description language to another page description language. These kind of services will be referred to more particularly as application services. Each application service will, when invoked for processing a certain document, effectuate a change of state of the document.

Typically, a number of application services will be involved in carrying out a job. The effect of each of these application services, when processing a document, will be described with reference to the change of state of the document. Starting from an initial state $s_i$, application services as selected according to the invention will process the document in sequence and/or parallel. As such, after each processing, the document will change state, until the target state $s_t$ has been reached. The application services involved form a path in a digraph according to which it is determined at which moment in the processing of a job an application service is next.

Figure 2:
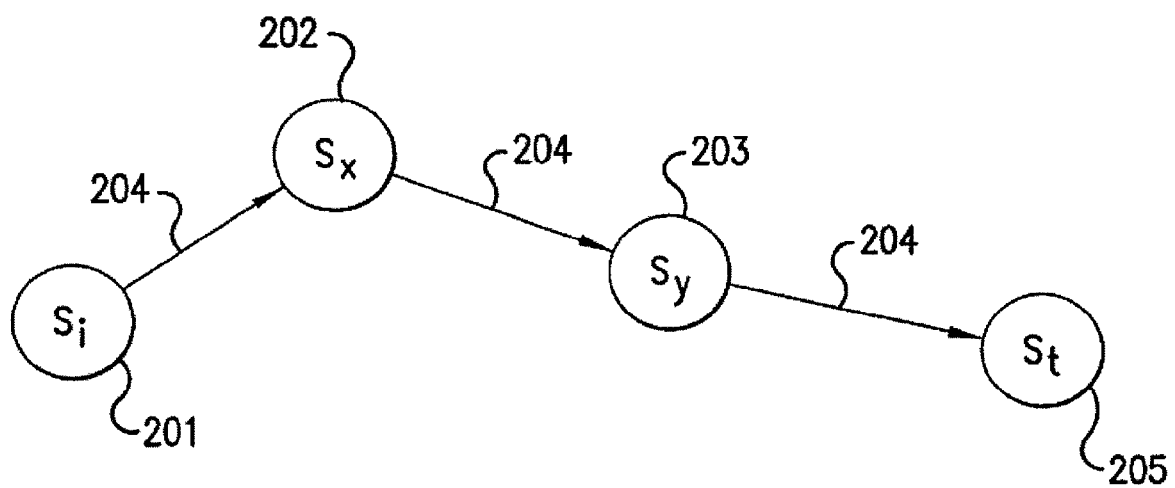
FIG. 2 is a digraph depiction of an example of a path of application services according to the invention.

FIG. 2 is a digraph depiction of an example of such a path of application services according to the invention. A node (201, 202, 203) in the path represents a particular state, $s_i$ that a document is in. An edge (204) in the digraph represents an application service that brings the document from an input state to an output state. In the path of services shown, the document is transformed stepwise from its initial state $s_i$ (201) via a number of intermediate states (202, 203) to the target state $s_t$ (205), where each step is accomplished by an application service. In the description, a state will be presented as an enumeration of explicitly typed parameter values.

Computational Environment

Figure 3:
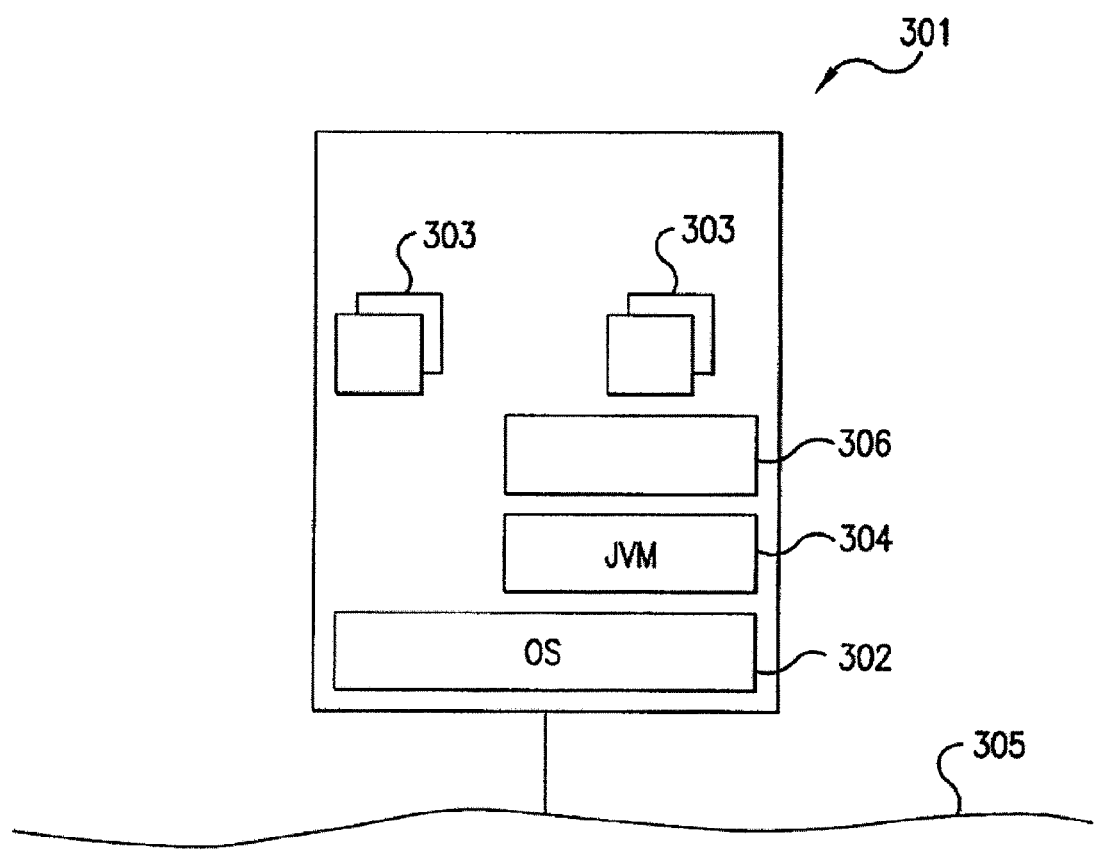
FIG. 3 depicts a global architecture of interconnected peripherals according to the invention.

FIG. 3 illustrates the global architecture of an interconnected peripheral 301 according to the invention. Each peripheral has its own operating system 302. Such an operating system performs basic tasks and defines the environment in which application programs will be run. Each peripheral has a number of application programs 303 that carry out specific tasks. Peripherals are connected with each other via a network link 305 and thus a networked system is formed. Via the network links, it is possible that application programs on different peripherals interact with each other.

In a particular implementation, some application programs are programmed in the Java language and need a Java Virtual Machine to be able to run in the peripheral. The Java Virtual Machine is provided as a layer 304 above the particular OS. As a consequence, all such application programs are able to run on all the peripherals despite the underlying different operating systems. To let the whole set of interconnected heterogeneous peripherals behave as one virtual machine from the viewpoint of the application, a middleware layer 306 is provided. A brand of middleware layer well known in the art is e.g. JINI of SUN MICROSYSTEMS Corporation. However, any other environment that offers applications, running on a variety of heterogeneous computers, for interacting with each other is equally applicable.

According to the invention, at various peripherals in the network, application services are available that perform specific functions on documents. All the application services together, distributed over the various peripherals in the system, make up a pool of services. For the purpose of the management of these application services, the middleware layer is extended with a service management system.

Figure 4:
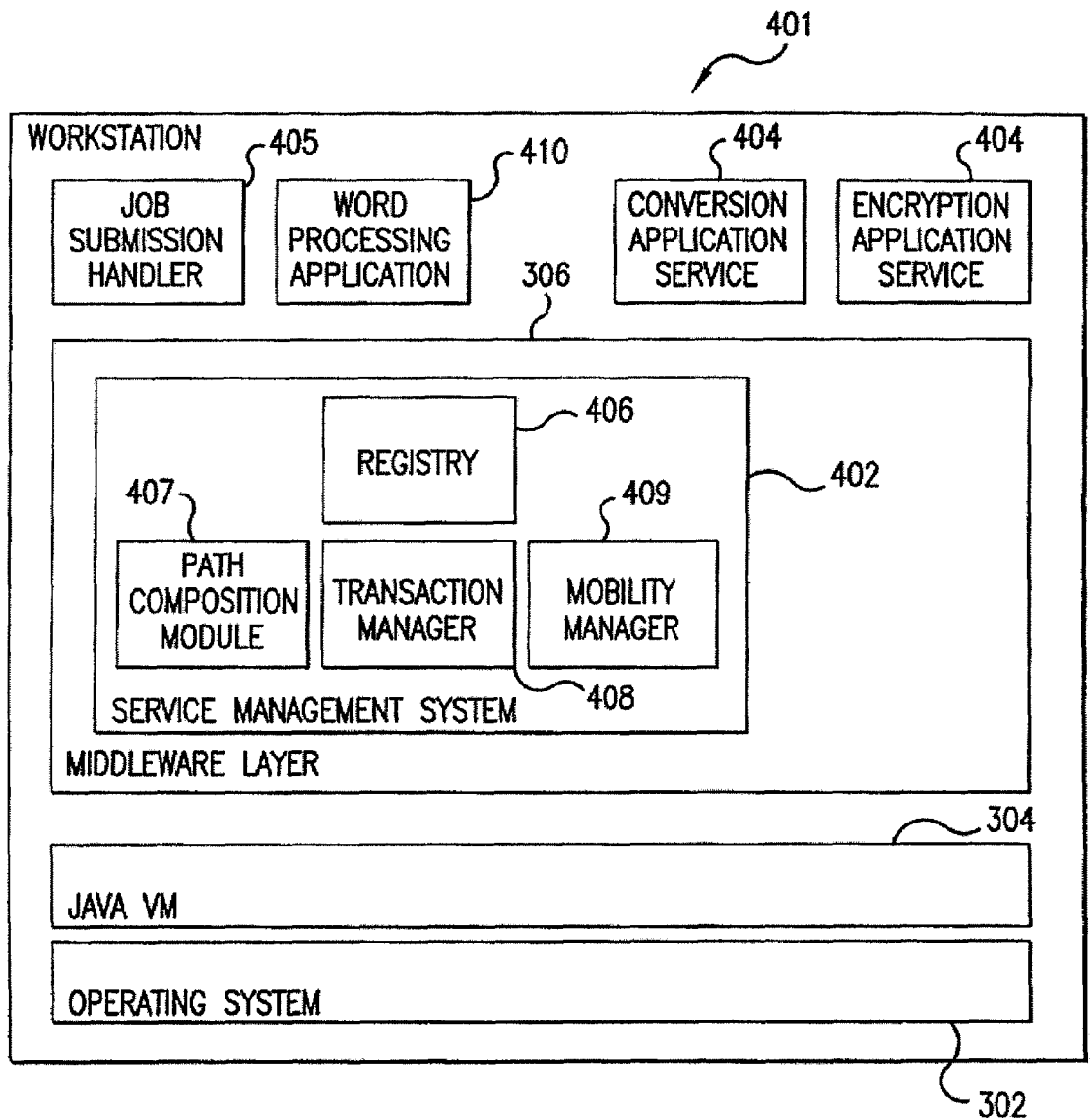
FIG. 4 depicts an example of a workstation provided with service management components according to the invention.

The service management system will further be explained with reference to FIG. 4. FIG. 4 depicts an embodiment of a workstation 401 provided with a service management system 402 as part of the middleware layer 306, a number of application services 404 and local applications 405 and 410. The service management system comprises a number of service management components. Basic service management components are available on each node all the time. Other service management components will be locally available as needed. The service management system makes it possible for the application services to be addressed both locally and remotely. Service management components can only be addressed by application services locally. If needed, a proxy is made for local access. The plurality of service management components comprises a registry 406, a path composition module 407, a transaction manager 408 and a mobility manager 409.

For the description of the system according to the invention, the object-oriented model will be used. This means that, where appropriate, the invention will be described with reference to classes and objects instantiated from these classes. An object can be envisaged as a container of data and this data can be accessed only via methods provided by the object. A persistent object is an object that is saved and restored automatically upon exiting and starting of an application. Instantiation of an object from a class will be indicated by the keyword "new". Background information regarding the java language and object oriented programming can be found in the publications "The Java Language Environment, A White Paper", by J. Gosling and H. McGilton and "The Java Platform", by Douglas Kramer, all of SUN MICROSYSTEMS Corporation.

The path composition module 407 according to the invention determines zero or more paths of application services that fulfill a job request. In this respect, a job request is referred to as a request object instantiated from the class Request. The class Request has as data members: inputState, outputState, and constraintExpression. Methods supported are getInput( ), getOutput( ) and getConstraintExpression( ). Typically, most application services will perform only very specific tasks and, as a consequence in most cases, the pool of services will not contain one service that exactly matches the request of the user. Thus, most of the time, the request can be matched by a combination of application services only. However, not every combination is desirable. Some paths may contain slow services or may contain expensive services. It is in particular the task of the path composition system according to the invention to find a suitable combination of services, operating within constraints specified by the user. The path composition module is implemented as the object pathComposer. The object provides the method pathComposer.getPath(Request) that will return zero or more paths that are in compliance with Request.

The registry 406 registers and deregisters application services and retrieves application services according to requested attributes and returns an identifier for invocation of the service. For this purpose, the registry internally manages a database of available application services. The database contains records of application services as depicted in the table shown in FIG. 5.

In FIG. 5, all data of an application service are stored in an application service record presented as a row in the table. Each application service is described by a type, a global unique identifier (GUID) and a set of attributes. The type gives a generic indication of the function that the service carries out. Attributes define the characteristics of a service: e.g. the specific function it carries out, physical characteristics like location, and accounting characteristics like price per print or price per unit of data. From appropriate attributes of a service, all possible transformations from a first state to second state that a service is able to carry out can be extracted e.g. by parsing technology known in the art. An accounting scheme may be defined by reference to one of a number of schemes, or it is defined explicitly as shown in the examples of FIG. 5. Below, FIG. 5 will be detailed discussed in more detail as part of the elaboration of the examples.

The registry 406 also contains a table for mapping the GUID on an address in the address space of the networked system. Similarly the registry also manages a database of service management components that are distributed over the network, like e.g. the path composition module.

The registry 406 is implemented as the object registry. Methods available for access of data are getService( ), getAttributes( ) and getOutputStates( ). The method registry.getService(retrieval_criterion) retrieves a service from the registry 406. This method returns an identifier of a service that fulfills the retrieval criterion. The method registry.getAttributes(Service) returns attributes from a particular service. Finally, the method getOutputStates(Service, inputState) returns output states attainable by a particular Service provided with a particular input State.

The transaction manager 408 will, when provided with a path, claim all resources needed and control invocation of all application services being part of the path for the purpose of actually carrying out the job.

The mobility manager 409 manages the migration of an application service from one host to another.

Other middleware components needed to manage the distributed environment regarding to binding or creating proxies are known in the art and will not further be detailed here.

Job Submission Handler 405

In the embodiment shown in FIG. 1, users may define and submit printjobs from one of the connected workstations as represented in FIG. 4. A workstation is provided with a print job submission handler 405. The print job submission handler is directly operable by the user when implemented as a print job submission application or it may be invoked by a printer driver started within another application program like e.g. a word processor program 406. The print job submission handler will be described in more detail now with reference to FIGS. 6*a*, 6*b* and 7.

FIG. 6*a* shows the operating screen presented to the user to define the job under control of the job submission handler 405. The user defines the job by entering values for the entries in the operating screen 601. Some entries, including number of copies (602), color printing (603), staple (604), output sheet (605), sorted/collated (606), density (607) and zoom factor (608), specify the product that will be delivered by the job. Some entries, including price rate (609), security level (610), reliability of service (611), place of delivery (612) and print before (613), are conditional constraints that (as far as they are defined by the user) have to be fulfilled. Further constraints are of course possible like e.g. physical distribution with a mailing list. The operating screen also contains a field (613) for entering a URL or memory location and filename referring to the document to be printed and a message area (614) for display of messages concerning the job. Finally, an OK button (615) and a CANCEL button (616) are provided for acknowledgement by the user that the specification of the job has been finished or that he wants to cancel the submission of the job.

Figure 7:
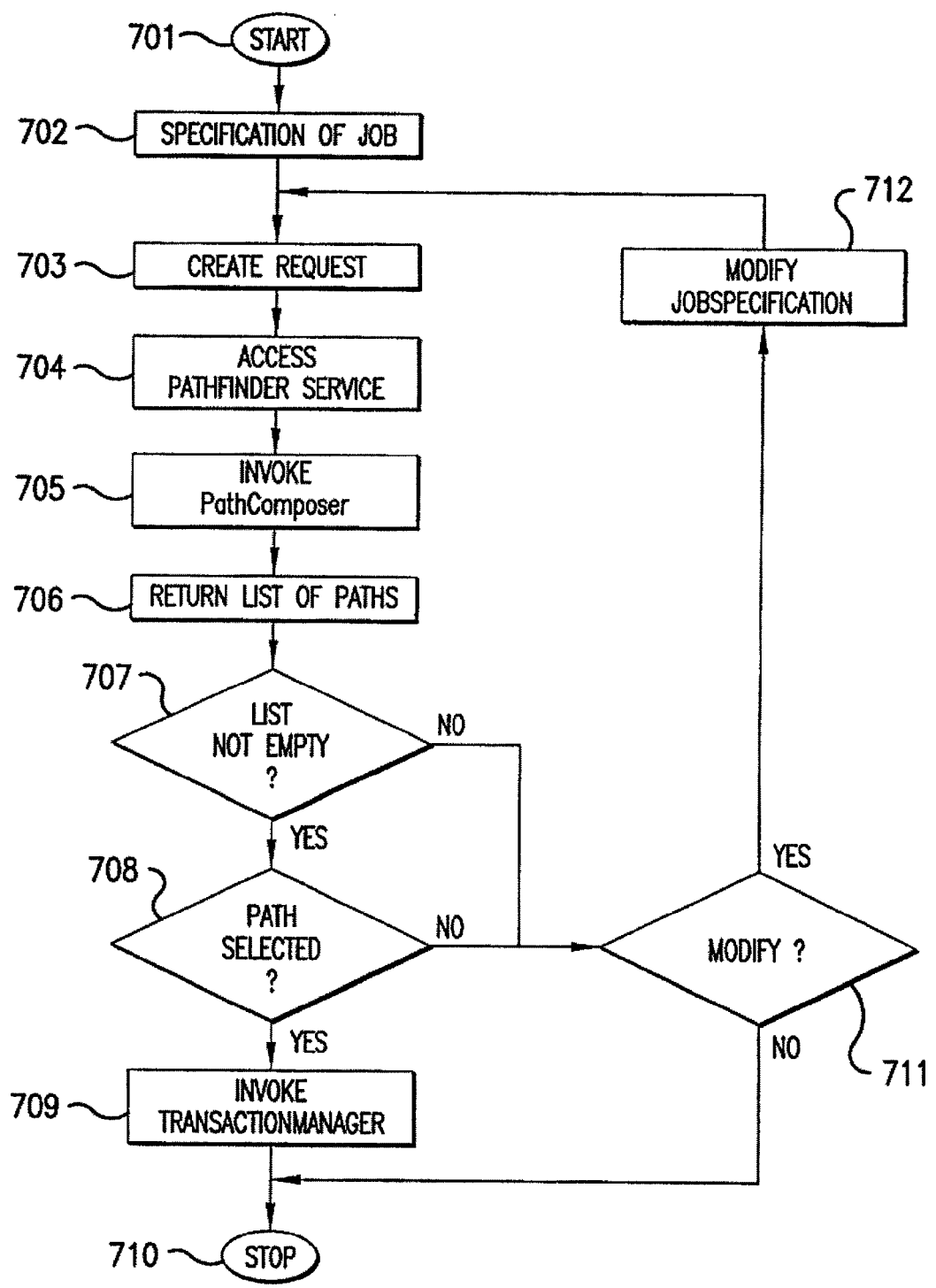
FIG. 7 is a flow diagram of a job submission handler method according to the invention.

FIG. 7 is a flow diagram presenting the steps that are carried out by the job submission handler. Upon activation of a print command or the like by the user, the job submission handler 405 is invoked (step 701). After invocation in step 702, the operating screen shown in FIG. 6*a* is presented to the user for entry of job parameters. After activation of the OK button, all parameters for the print job are collected including default values for parameters not specified by the user. Next in step 703, a Request object is created and instance variables inputState, outputState and constraintExpression are initialized with the collected parameter values. It is noted that an expression reflecting the constraints entered by the user is assigned to the constraintExpression instance variable.

R=New Request (inputState, outputState, constraintExpression).

Next in step 704, the Registry is asked for access to a path composition module:

pathComposer.getListOfPaths(R)

Registry.getService (type=PathComposer).

The Registry returns a handle for a path composition module, and under control of the registry a proxy of the pathfinder at the local station is created.

Subsequently in step 705, the path composition module is asked to return paths for the defined request:

pathComposer.getListOfPaths(R)

In step 706, the path composition module returns a list of paths that will deliver the product as specified by the job. Besides all paths found, the list includes for each path: values of constraint parameters in a ConstraintRecord; and a flag indicating if compliance with specified constraints exists.

In the message area, values of the constraint parameters are displayed for each path found. An example is given in FIG. 6b. The user may select a path by clicking with a pointing device (such as a mouse) on one of the areas 617. In case a great number of paths are returned, the system offers the user the possibility to rank these paths according to one of the constraints, by clicking with a pointing device on one of the areas 618. In the case presented, the paths are ranked according to the constraint price. The most attractive path with respect to price is placed at the top.

In step 707, it is checked if the list contains any paths. If this is the case (Y), the method continues with step 708 where the user is prompted for selection of one of the paths. If the user selects one (Y), the method continues with step 709. In step 709, the transaction manager 408 is invoked and provided with the path selected. The transaction manager 408 claims application services needed, and invokes subsequently the services needed to fulfill the request. Return messages from the invoked services are received by the Transaction Manager 408. The transaction manager 408 forwards these messages to the client application, i.e. the job submitter handler 405. The job submitter handler 405 displays these messages in the message area of the operating screen. When the job has been finished and delivered, this is also displayed in the message area of the operating screen. Upon acknowledgement of this message by the user in step 710, the job submission handler 405 logs the data of the job in a logfile and finally the method exits.

If, in step 707, the list of paths returned is empty (N), then the path composition modules returns a message that the job cannot be executed under the requested product specifications and continues with step 711. Also in case the user does not select a path in step 708 (N), then, the method continues with step 711.

In step 711, the user is asked to modify parameters belonging to the specification. If the user responds in the negative (N), the method exits in step 710 and no job will be carried out. If the user accepts this possibility (Y), the method continues with step 712, where the user edits the job specification where after all parameters are collected and, again in step 703, a new request object is instantiated.

Path Composition Module

The getPath( ) method of the path composition module will now be described in detail with reference to the flow diagram presented in FIG. 8. The task of the getPath( ) method is to find a path of application services that can perform a certain task within given constraints.

To this end, the method carries out the following steps:

At invocation, in step 801 of the getPath method, the Request R is passed. In the Request, the initial state of the data object to be transformed, the desired target state after the complete transformation and constraints to which the complete transformation has to comply are specified.

In step 802, a queue object q, a graph object g and an object listOfPaths are instantiated and initialised. The object q and the object listOfPaths are instantiated from the class List that supports the methods addElement( ), hasMoreElements( ) and getNextElement( ). The method addElement( ) adds an element to the list. The method hasMoreElements( ) returns TRUE if the list contains any elements and returns FALSE otherwise. The method getNextElement( ) returns the next element in the list and removes it from the list. At initialization, the inputState of the request will be placed as an element in the queue object q.

Figure 9:
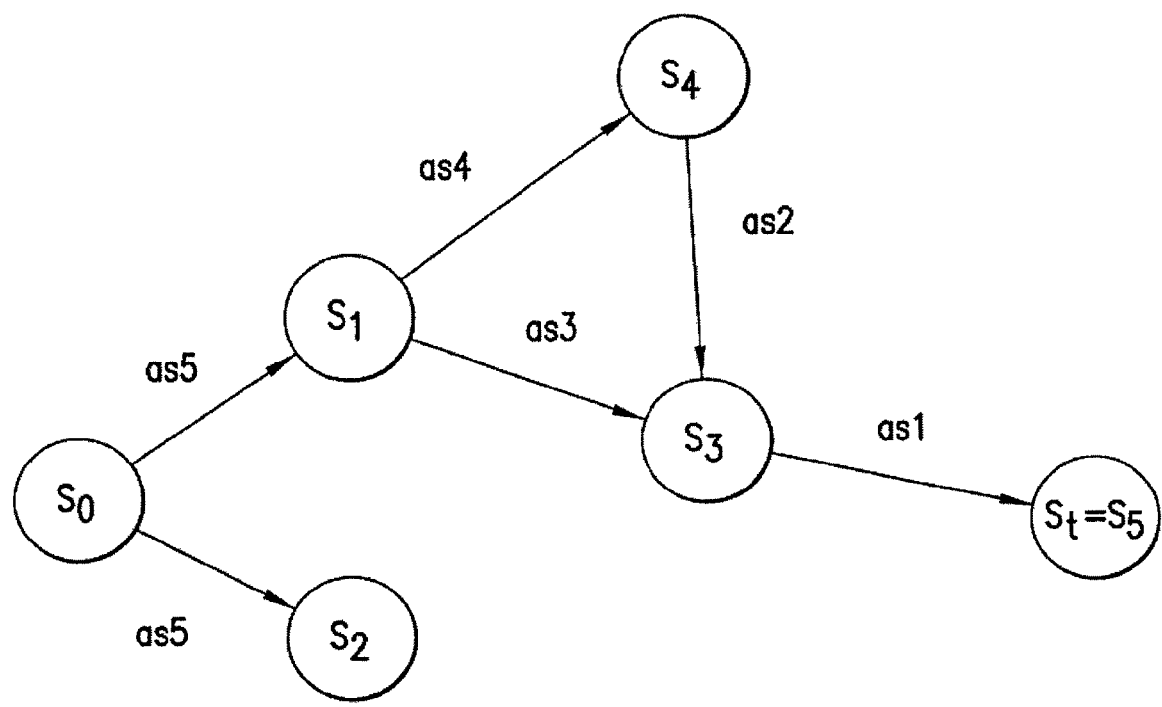
FIG. 9 is a digraph of services grouped together during execution of the getPath( ) method according to the invention in terms of the example discussed below.

The graph object g is instantiated from the class Graph. Objects instantiated from the class Graph are used to store and manipulate a directed graph. A node in the graph represents a state of a document and a directed edge starting from a first node going to a second node represents an application service that transforms the state of the first node into the state of the second node. With respect to the request, the graph object administers (during the execution of the getPath( ) method) all states that at a certain moment are attainable and the application services needed for that. FIG. 9 shows an example of such a graph as it will be built during execution of the getPath( ) method. The class Graph supports the methods setRequest( ), addNode( ), contains( ), connect( ), returnPaths( ) and pathFound( ). The method setRequest adds a node for the input state and stores the Constraints expression. The method addNode( ) adds a node to the Graph. The method connect(Node1, Node2, Service) adds an edge from Node1 to Node2 associated with the application service that is able to carry out this state transformation. The method contains(Node) checks if a node is contained in the graph. The method pathFound( ) returns TRUE if a path has been found. The method returnPaths( ) returns paths found.

The above for step 802, results, in:

q=new Queue( )
q.addelement(R.input)
g=new Graph( )
g.setRequest(R)

In step 803, it is checked if there are any elements in the Queue. If not (N), step 814 is next. If elements are available (Y), a next input state is fetched from the queue and a list of application services (LAS) that are able to perform a transformation on the input state is requested to the Registry in step 804:

currentIn=q.getNextElement( )

LAS=Registry.getService
 (INPUT_STATE==currentIn).

Fulfillment of the search criterion for INPUT_STATE is checked with regard to the 'conversion-supported' attribute of the services as listed in FIG. 5.

In step 805, it is checked if the List of application services LAS contains any elements. If not (N), the method continues with step 803 to continue with a next input state. If so (Y), in step 806, a next application service is taken from the list and a List of output states to be delivered by the Application Service at hand (LOS) is formed:

currentApplicationService=LAS.getNextElement( )
LOS=Registry.getOutputStates(currentApplicationService, currentIn)

In step 807, it is checked if a next element is available in LOS. If not (N), the method continues with step 805 to continue with a next application service. If so (Y), in step 808, an output state is taken from the list:

currentOut=LOS.getNextElement( )
It is checked if this state has already been reached earlier:

g.contains(currentOut)

If not (N), the method continues with step 809 where the state is added to the Queue and added as a node to the Graph:

q.addElement(currentOut) g.addNode(currentOut)

Next, step 810 is carried out. In case the outcome of step 809 is positive (Y), the method continues directly with step 810. In step 810, the current application service is added as an edge to the Graph g.connect(currentIn, currentOut, currentApplicationService)

In step 811, it is checked if a path from input to target exists g.pathFound( )

If this is not the case (N), the method continues with step 806.

If it is predetermined at step 811 that a path has been found (Y), the method continues with step 812. In step 812, paths found in this iteration are requested from the Graph with the returnPaths( ) method. For each path, all parameters present in the constraintExpression are calculated. Heretofore, for each service in the path, contributions to parameter values are established and subsequently, for each parameter, a global value for the whole path is calculated. These calculated values are stored in a constraintRecord for that particular path. With these values, the constraintExpression is evaluated and, if the outcome of the evaluation is such that fulfillment exists, a complianceFlag for that particular path indicating fulfillment with the requested constraints is set and a counter p is incremented by one. The tuple (path, constraintRecord, complianceFlag) is added as element to the listOfPaths:

listOfPaths.addElement((path, constraintRecord, complianceFlag))

Next in step 813, it is checked if the number of paths p that fulfils requested constraints surpasses a threshold P. If this is the case (Y), the method continues with step 814. In step 814, the list is returned and the method exits in step 815. If this is not the case (N), the method continues with step 806, to search for next paths.

If no paths are found at all, the method steps through loops formed by steps 811 (N), 807, (N), step 805 (N) and step 803 (N), where step 814 is reached and an empty list is returned. In this way, a complete graph of all appropriate services has been traversed.

If the number of paths that fulfill the constraints is less than the desired number P (step 813: N), these paths are added to the list in step 812 and eventually (via the steps 806, 805, and 803) step 814 is reached where the list with paths collected so far is delivered.

Optionally, the number of iterations from step 811 to step 806 can be limited to a certain maximum, so that when this maximum is reached then the method continues with step 814 where all paths collected so far will be returned. This measure inhibits time consuming building of the graph in case a great number of services is available.

Class Graph

An embodiment of a class Graph as used in the system according to the invention will be described with reference to FIGS. 8 and 9.

Figure 8:
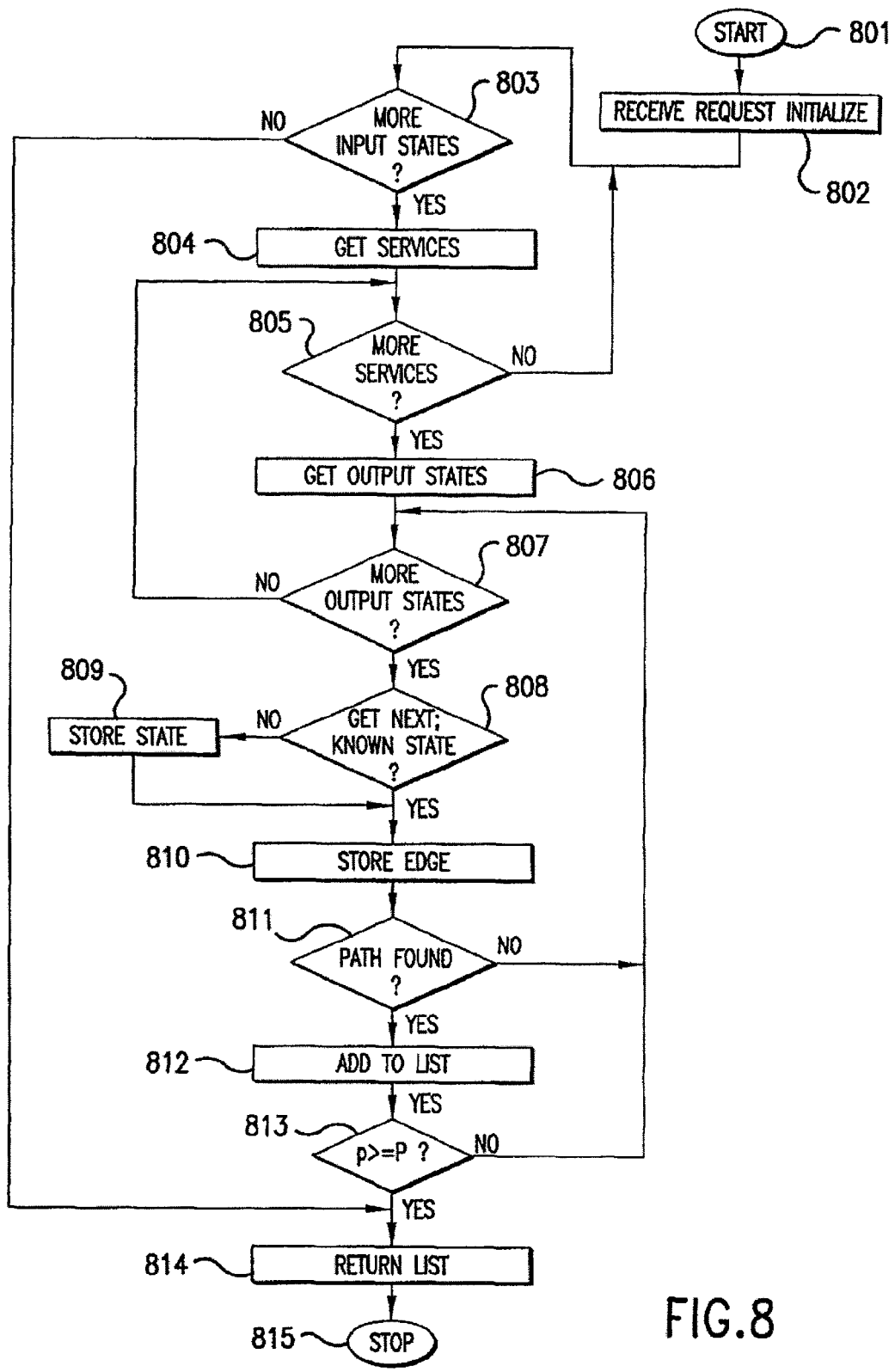
FIG. 8 is a flow diagram of a getPath( ) method according to the invention.

A graph object instantiated from the class Graph represents a directed graph that is created and initialized in step 2 of FIG. 8 and extended during the repeated executions of steps 10 and 11 in FIG. 8. In the graph depicted in FIG. 9, a node represents a state and a directed edge starting from a first node going to a second node represents an application service that transforms the state of the first node into the state of the second node. With respect to the request, the graph administers all states that at a certain moment are attainable and the application services needed for that. Initially, the graph comprises a start node.

Methods supported for a graph object are: setRequest( ), addNode( ), contains( ), pathFound( ), returnPath( ) and connect( ).

Internal elements of the graph are:
    a vector v which elements represent the nodes of the graph;
    a matrix of connections C with elements $c_{ij}$;
    a reachableSet containing states that are reachable from the initial state; and
    a transformableSet containing states that can be transformed to the target state; and
    a pathFoundFlag.

An element $v_i$ of the vector v corresponds with node $n_i$ of the graph. Each node represents a state. A state is represented by a vector s. Element $s_i$ of a state represents a parameter i. An information object e.g. a document has a state that is determined by the actual values of a number of parameters. Edges, representing a transformation from one state to another, are stored in matrix C. Each element (i,j) provides transformations to come from the state of node i to the state of node j.

The formation of a graph object will be further explained now along the flow of method invocations as presented in the getPath( ) method with reference to FIG. 8.

In step 802, the Graph object is created by invocation of the statement:

g=new Graph( )

and subsequently initialised by invocation of the method g.setRequest(R).

Parameters passed are: the initial state $s_o$, the target state $s_t$ and constraintExpression cE. The vector v gets two elements: $s_o$ and $s_t$. The matrix C is initialised with only null values. The reachableSet is initialised with the initial state $s_o$ and the transformableSet is initialised with the target state $s_t$.

In step 809, the currentOut state or node is apparently not yet known and the state is added to the reachableSet. Also, invocation of the method g.addNode( ) accomplishes addition of the state to the vector and an update of the matrix adding an additional row and an additional column.

In step 810 the method g.connect(currentIn, currentOut, currentApplicationService) updates the matrix by looking up the index for currentIn and for currentOut from the vector and subsequently adds the currentApplicationService to the position with this index. Furthermore as part of the method g.connect( ), it is checked if the node currentOut is contained in the transformableSet. If this is the case the pathFoundFlag is set and the method carries out a graph traversal algorithm to find available paths. In step 812, these paths are passed to the calling program (i.e. the getPath( ) method) by the returnPath( ) method, whereafter the pathFoundFlag is reset. Furthermore, all nodes that are member of a path are placed in the transformableSet. In this way, in next iterations when a node is reached that is already part of a path, it can be concluded that a new path has been found. Further steps of the getPath( ) method are already discussed earlier.

EXAMPLE

The versatility of the system according to the invention will now be illustrated by reference to an example. Given are that the application services as registered according to FIG. 5 and the image forming system is as shown in FIG. 1. A state is defined as a collection of explicitly typed parameter values.

At workstation 106, a user specifies a print command resulting in a screen as shown in FIG. 6a. The printfile generated by the application on workstation 106 is coded in emf (enhanced metafile).

According to the flow diagram of FIG. 7, within the job submission handler in step 703, a request object is created R=New Request ($s_{source}$, $s_{target}$, cE)

where
source state $S_{source}$=(format: emf)
target state $S_{target}$=(format: A4,
    stapling: Y,
        number=100,
        sorted/collated=sorted)
constraints cE=(price rate=<15$)

So the input state is defined by format: emf; the output state is defined by format: A4 (implying printing), stapling, sorted and number of copies 100; and the constraint expression is (price rate=<15$).

Next in step 704, a pathfinder service is looked up. A pathfinder service is available at Server 107 and subsequently a proxy for the pathfinder service is created at the workstation 106. Next in step 705, the pathfinder is invoked with the request:

Pathfinder.getpaths(R)

According to the flow diagram presented in FIG. 8, upon reception of the request in step 802, a queue q and a graph g are created and initialised:

For the queue, this results in:

q={$s_0$}, where $s_0$=$s_{source}$=(format: emf)

For the graph g, a node for the initial state and a node for the target state is created.

Internally for the Graph object, this means:

$\underline{v}$=($s_0$) C={0}targetState=$s_{target}$
        reachableSet={$s_0$}transformableSet={$s_t$}

In step 804 of the getPath() method, first an element from the queue is taken currentIn=$s_0$ Subsequently application services are looked up (FIG. 5) that are able to perform a transformation on the input state. A List of Application services LAS is, in the end, returned:

LAS={as5}

After a check in step 805 that LAS contains any elements (Y) in step 806, as5 is taken from the list, and a List of output states LOS deliverable by the application service is formed:

currentApplicationService=as5

LOS={$s_1$, $s_2$} where $s_1$=(format: PCL) and $s_2$=(format: HTML)

After checking in step 807 if LOS contains any elements (Y), in step 808 an element is taken from the list and it is checked if this element is already a node in the Graph:

currentOut=$s_1$ $g.contains\,(s1)$

This returns False (N), so (in step 809) $s_1$ is stored as a node in the Graph and it is added to the queue q and added to the reachableSet:

q.addElement($s_1$) g.addNode($s_1$) reachableSet={$s_0$, $s_1$}

Thereafter in step 810, the transformation from state currentIn to state currentOut by application service currentApplicationService is stored as a directed edge in the graph:

g.connect($s_0$, $s_1$, as5)

Internally for the Graph object g, the execution of steps 809 and 810 means that the node is added to the vector and to the reachableSet and that, after adapting the dimension of matrix C, the currentApplicationService is added to the matrix.

With respect to the internal members of g, this results in:

$\underline{v}$=($s_0$, s1) reachableSet={$s_0$, $s_1$}

$$C = \begin{matrix} 0 & as5 \\ 0 & 0 \end{matrix}$$

transformableSet={$s_t$}

Hereafter in step 811, the method checks if the node currentOut is contained in the transformableSet. This is apparently not the case (N), g.pathFound() returns FALSE, so that the method continues with step 807.

The element $s_2$ is available in LOS (Y), so (in step 808) this element is taken from the list and the same sequence of steps 809-810-811 is carried out as explained before.

This yields q={$s_1$, $s_2$}
and, for the internal members of g this results in:

$\underline{v}$=($s_0$, $s_1$, $s_2$) reachableSet={$s_0$, $s_1$, $s_2$}transformableSet={$s_t$}

$$C = \begin{matrix} 0 & as5 & as5 \\ 0 & 0 & 0 \\ 0 & 0 & 0 \end{matrix}$$

pathFoundFlag=FALSE

In step 811, the flag Pathfound is checked. This yields again 'FALSE' (N), so the method continues with step 807. In step 807, it is checked if LOS contains any output states. That is not the case (N), so the method continues with step 805. In step 805, it is checked if the list LAS contains any elements. This is not the case (N). The method continues with step 803. In step 803, it is checked if the queue q contains any elements. This is indeed the case (Y). In step 804, the next element from the queue is taken and a listOfApplicationServices LAS is returned for this state:

currentIn=$s_1$ LAS={as3, as4}

After a check for the presence of an element in the List in step 805 (Y), as3 is taken from the list and a list of output states delivirable by this application service is formed:

currentApplicationService=as3 LOS={$s_3$} where $s_3$=
        (format: Postscript)

Subsequently steps 808-809-810-811 are carried out resulting in:

q={$s_2$, $s_3$}$\underline{v}$=($s_0$, $s_1$, $s_2$, $s_3$) reachableSet={$s_0$, $s_1$, $s_2$, $s_3$}transformableSet={$s_t$}

$$C = \begin{matrix} 0 & as5 & as5 & 0 \\ 0 & 0 & 0 & as3 \\ 0 & 0 & 0 & 0 \\ 0 & 0 & 0 & 0 \end{matrix}$$

pathFoundFlag=FALSE

In step 811, the flag Pathfound is checked. This yields again 'FALSE' (N), so the method continues with step 807. In step 807, it is checked if LOS contains any output states. That is not the case (N), so the method continues with step 805. In step 805, it is checked if the list LAS contains any elements. This is indeed the case (Y). The method continues with as4 as currentApplicationService. This ApplicationService yields as output states:

LOS={$s_4$} where $s_4$=(format: PDF)

After processing in steps 808-811 this results in:

q{$s_2, s_3, s_4$}v=($s_0, s_1, s_2, s_3, s_4$) reachableSet={$s_0, s_1, s_2, s_3, \overline{s_4}$}transformableSet={$s_t$}

$$C = \begin{matrix} 0 & as5 & as5 & 0 & 0 \\ 0 & 0 & 0 & as3 & as4 \\ 0 & 0 & 0 & 0 & 0 \\ 0 & 0 & 0 & 0 & 0 \\ 0 & 0 & 0 & 0 & 0 \end{matrix}$$

pathFoundFlag=FALSE

The method returns via steps 807 (N) and 805 (N) to step 803 (Y). In step 804, s2 is taken from the queue q. Inspection of the register learns that there are no application services available that have HPGL as an input state. Thus, the method returns to step 803, where s3 is taken from the queue q. Carrying out of steps 804, 805, 806, 808 and 809 yields:

LAS={as1}currentApplicationService=as1 LOS={$s_5$}
where $s_5$=(sheet=A4, color=No, Staple=Yes)
currentOut=$s_5$ This leads to the situation in step 810 where:

q={$s_4, s_5,$}v=($s_0, s_1, s_2, s_3, s_4, s_5$) reachableSet={$s_0, s_1, s_2, \overline{s_3}, s_4, s_5$}transformableSet={$s_t$}

$$C = \begin{matrix} 0 & as5 & as5 & 0 & 0 & 0 \\ 0 & 0 & 0 & as3 & as4 & 0 \\ 0 & 0 & 0 & 0 & 0 & 0 \\ 0 & 0 & 0 & 0 & 0 & as1 \\ 0 & 0 & 0 & 0 & 0 & 0 \\ 0 & 0 & 0 & 0 & 0 & 0 \end{matrix}$$

In step 811, it is checked if $s_5$ is a superset of one of the states comprised in the transformable set. Indeed $s_{target}$ is a subset of $s_5$. This yields (Y):

pathFoundFlag=TRUE.

The method continues with step 812. In step 812, the path found is established. This yields: (as5, as3, as1). This path is passed by the returnPath( ) method to the calling program (i.e. getPath( ) method) and the pathFoundFlag is reset. A constraintRecord is determined for each constraint parameter. Only the parameter 'pay' is specified. Thus the total price for the path found is calculated. This yields: constraintRecord=(pay: 14$). With the calculated value, the constraintExpression is evaluated. This yields TRUE. The obtained tuple is added to the listOfPaths. This yields:

listOfPaths=(((as5, as3, as1), (pay: 14$), TRUE)).

In the example we will suppose that P=2.

Next in step 813, it is checked if p>=2. This is not the case. So a next path has to be found.

This yields the path (as5, as4, as2, as1). Also, this path will be added to the listOfPaths resulting in:

listOfPaths=(((as5, as3, as1), (pay: 14$), TRUE),
((as5, as4, as2, as1), (pay: 13$), TRUE)).

Finally in step 814, this list is returned to the job submission handler. In step 708, the paths will be displayed for selection by the user, ordered by price as indicated in FIG. 6*b*. The user selects one where the method continues as described before.

In a variation of the embodiment described so far, application services are provided with an additional attribute, indicating if the application service is able to migrate to another location or not. In case now, that a user requests a job, where the constraint 'Security Level' (610) is specified as 'high', meaning that the document of concern has to remain within a firewall, the path composition module will compose a path of services, consisting of services that are already within the firewall, or services that are able to migrate inwards the firewall. After selection of a path by the user, the transaction manager 408 takes care that the mobility manager 409 migrates the application services needed, whereupon the transaction manager controls invocation of all application services being part of the path, for carrying out the job.

In another variation of the embodiment, in case no paths are found that fulfill the request, the system relaxes the circumstantial constraints. This is done by skipping the step of evaluating the constraint Expression. All paths found so far are returned and offered to the user together with the calculated value of the constraints. The user can then decide, if he wants to make use of such an offer or not, by activating one of the buttons 'Selection ok' and 'Cancel' in the screen depicted in FIG. 6*b*.

It is noted that the invention is not restricted to text documents but the invention is equally applicable to all kinds of documents e.g. documents that contain only, or in combination, video information and audio information.

Having now fully described the invention, it will be apparent to one of ordinary skill in the art that many changes and modifications can be made thereto without departing from the scope of the appended claims.

The invention claimed is:

1. A distributed document handling system for carrying out a job, where the job is a transformation of a document with an initial state to a document to be delivered in a different final state carried out by application services distributed over a network and where the job results in a product which is the document to be delivered in the different final state, the system comprising:
 a number of interconnected computer processing devices
  for providing a pool of application services, wherein the pool of application services is used to process the document to effectuate a change of state of the document;
 at least one application service having a location attribute and an attribute indicating if the service is able to migrate to another location or not;
 specifying means for entering by a user a job specification comprising product specifications specifying the product to be delivered by the job and specifications specifying circumstantial constraints without effect on the product in considering selection from the pool of services;

determining means for determining a path of application services, a path comprising at least two application services, the services being selected from the pool of application services, wherein the path carries out the job in accordance with the product specifications, including taking into account if the at least one application service has an attribute indicating if the service is able to migrate to another location or not, wherein a security level of the job is a conditional constraint and wherein the determining means determines if migration of an at least one application service, having an attribute indicating if the service is able to migrate to another location, fulfills the security level, and further comprising means for, upon modification of the job specification, involving the determining means again for determining a path of services, based on the modified job specification, and wherein the determining means takes into account circumstantial constraints for that job but does not evaluate the circumstantial constraints if no paths are found to fulfill the user job specification.

2. A computerized method of creating and using application services distributed over a computer network for carrying out a job, where the job is a transformation of a document with an initial state to a document to be delivered in a different final state and results in a product which is the document to be delivered in the different final state, the method comprising:

creating a pool of application services, the application services being distributed over a number of interconnected computer processing devices, at least one application service having a location attribute and an attribute indicating if the service is able to migrate to another location or not, wherein the pool of application services is used to process the document to effectuate a change of state of the document;

creating a job specification comprising product specifications specifying the product to be delivered by the job and specifications specifying circumstantial constraints without effect on the product in considering selection from the pool of services;

determining a path of application services, a path comprising at least two application services, the services being selected from the pool of application services, wherein the path carries out the job in accordance with the product specifications, including taking into account if the at least one application service has an attribute indicating if the service is able to migrate to another location or not, wherein a security level of the job is a conditional constraint and wherein the determining means determines if migration of an at least one application service, having an attribute indicating if the service is able to migrate to another location, fulfills the security level, further comprising modifying of the job specification by determining a path of services, based on the modified job specification, and wherein circumstantial constraints are taken into account for that job but does not evaluate the circumstantial constraints if no paths are found to fulfill the user job specification.

* * * * *